Figure 5:

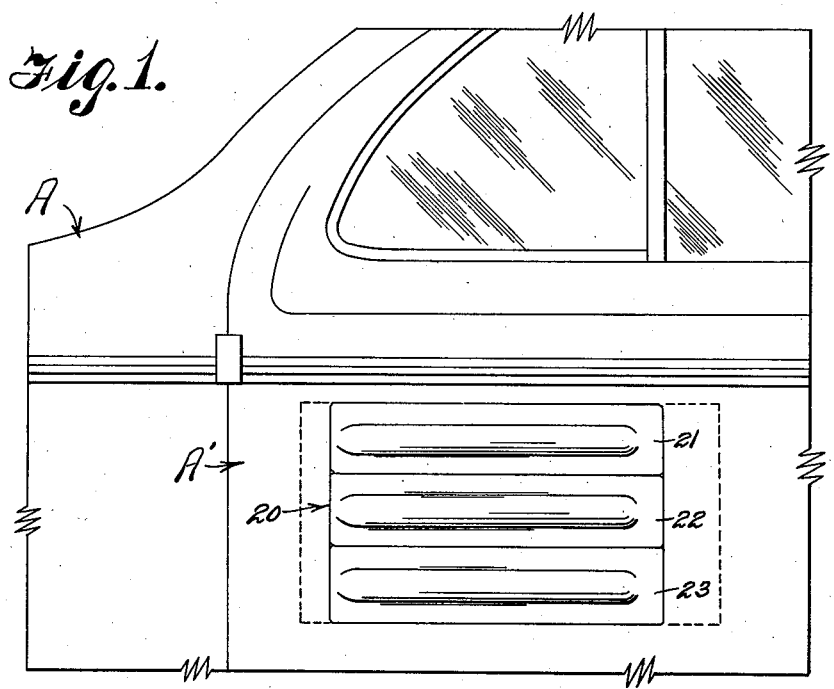
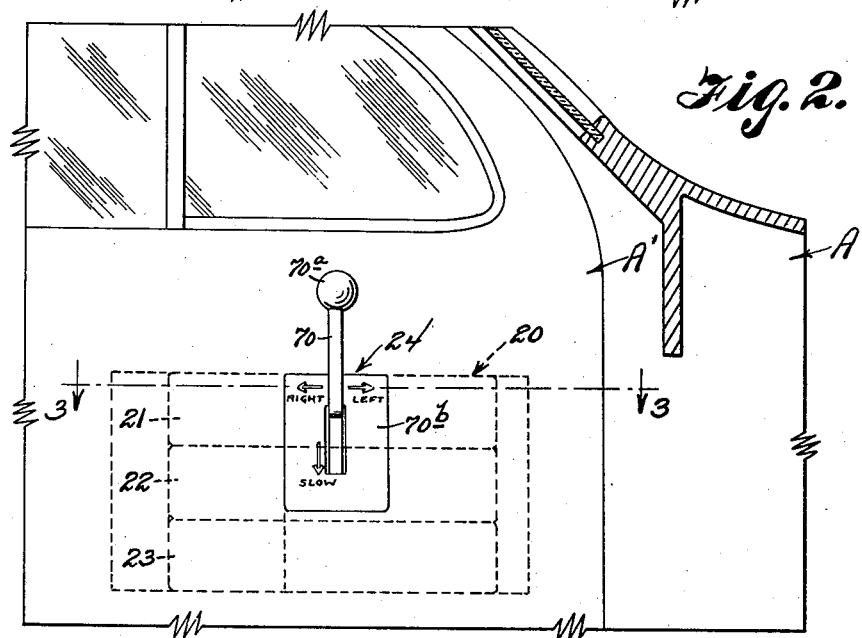

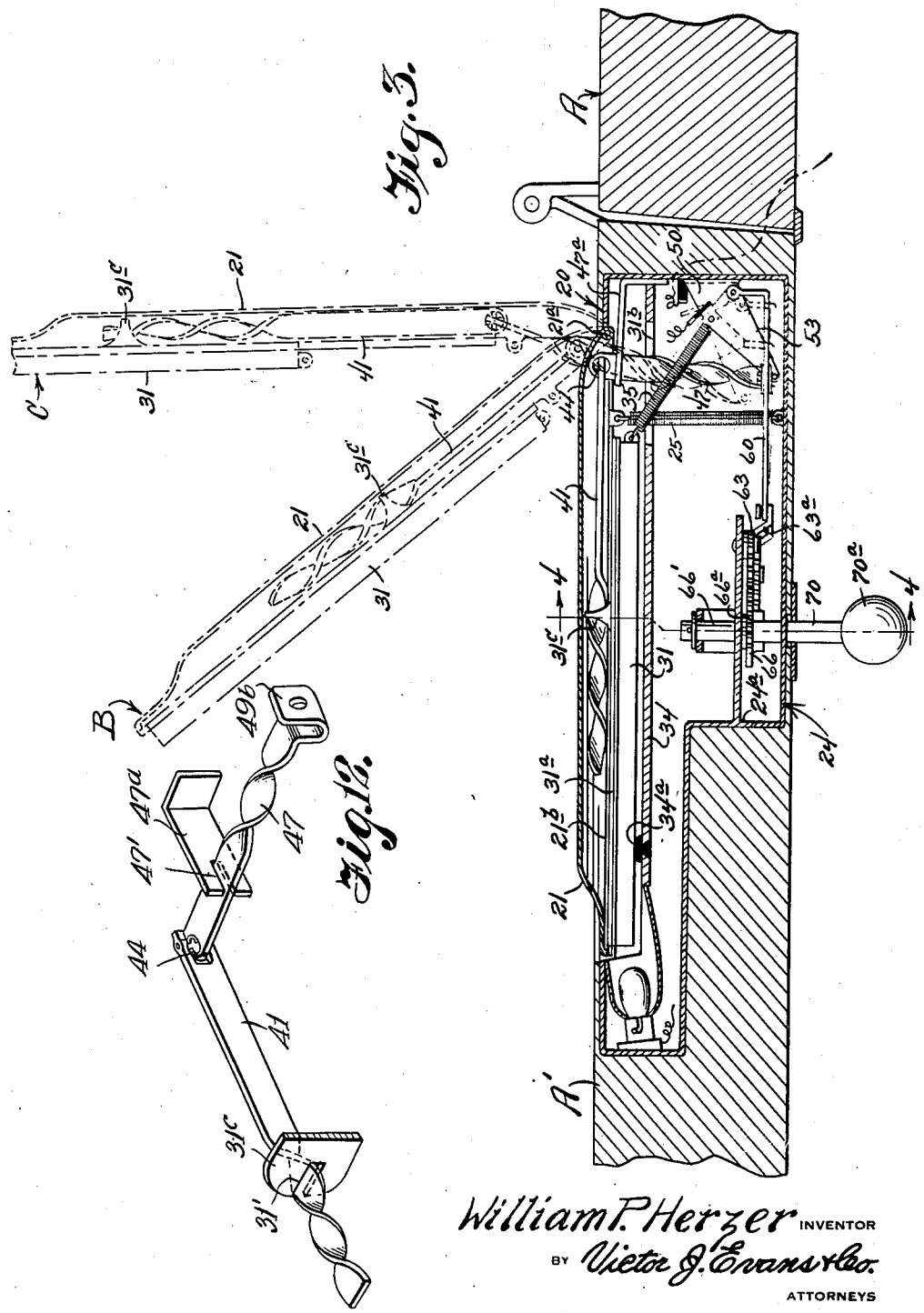

June 3, 1941.  W. P. HERZER  2,244,458
VEHICLE DIRECTION INDICATOR
Filed Nov. 8, 1939  4 Sheets-Sheet 3
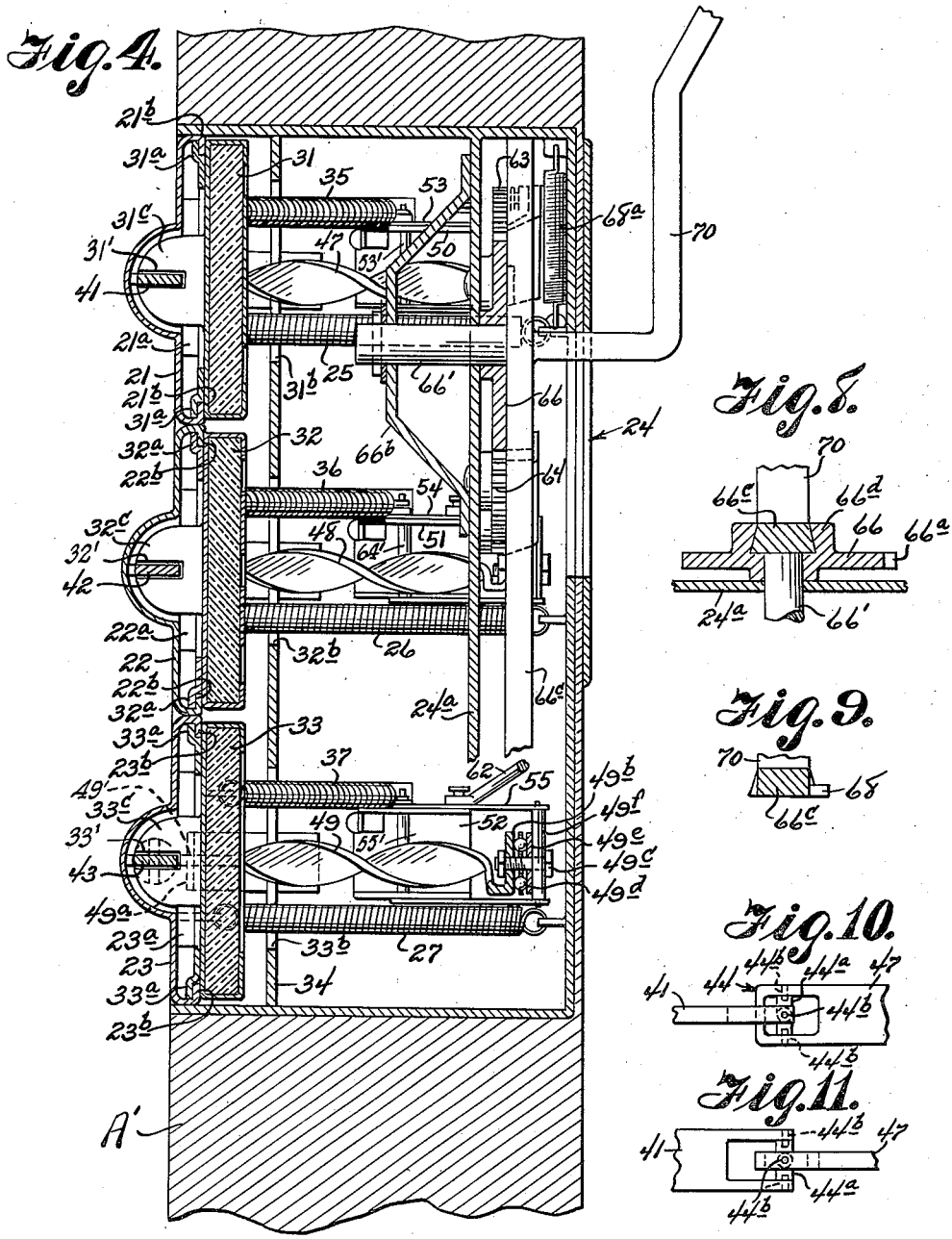
William P. Herzer
INVENTOR
BY Victor J. Evans & Co.
ATTORNEYS June 3, 1941.   W. P. HERZER   2,244,458
VEHICLE DIRECTION INDICATOR
Filed Nov. 8, 1930   4 Sheets-Sheet 4

William P. Herzer
INVENTOR
BY Victor J. Evans & Co.
ATTORNEYS

Patented June 3, 1941

2,244,458

UNITED STATES PATENT OFFICE 2,244,458

VEHICLE DIRECTION INDICATOR

William P. Herzer, Boulder, Colo.

Application November 8, 1939, Serial No. 303,481

3 Claims. (Cl. 116—53)

This invention relates to improvements in signalling devices and especially is concerned with a signalling device suited for use on an automotive vehicle for indicating to other drivers intended changes in direction of travel.

It is an object of the present invention to provide a novel signalling device of the type which can be mounted in parts of a vehicle door and which can be operated conveniently by the driver within the vehicle to indicate contemplated changes in direction of motion of the vehicle.

Another object of the present invention is to provide a novel vehicle signalling device including a plurality of independently operable signal units which may be selectively operated by means of a single manual control.

Another object of this invention is to provide in a signal unit of the type including a horizontally swinging signal element, means operable to cause lateral sliding motion of the flexible signal element when the same is moved into outwardly extended position.

An advantage of the novel signalling device according to this invention over existing types of signalling units is that the former is manually operated, hence more reliable and further is characterized by ruggedness and simplicity of construction, the former assuring long useful life and the latter providing for the full utilization of the benefits in the manufacture of mass production.

A feature of the novel signalling device according to this invention is that the control of the device affords visual indication of the signal in extended position, thereby permitting the operator of the vehicle, when circumstances do not otherwise permit, to determine which selected signal is operated.

Other objects, advantages and features of the new and improved signalling device according to the present invention will be apparent to those skilled in this art during the course of the following description.

Regarded in certain of its broader aspects, the novel signalling device according to the present invention comprises in a casing within which a pivotally mounted horizontally outwardly swinging signal arm normally is concealed, the arm forming a cover for the casing and being spring-urged into closed position, of the improvements which comprise a first helicoidal member rotatably mounted within the arm, a sliding signal element mounted on said arm connected to and movable by rotation of said member; a swinging carriage mounted within said casing, a second helicoidal member freely rotatably mounted on said carriage connected to and rotatable with the first helicoidal member; a stationary element mounted within the casing embracing the second helicoidal member whereby swinging motion of the carriage causes the signal element to be slidingly moved outwardly into fully extended position; and an operating lever connected to said carriage for imparting swinging motion thereto.

In order to facilitate a fuller and more complete understanding of the present invention a specific embodiment thereof herein illustrated will be hereinafter described, it being clearly understood, however, that the illustrated embodiment, although presently preferred, is provided solely by way of example of the practice of this invention and not by way of limitation thereof except insofar as the invention is recited in the subjoined claims.

Figure 6:
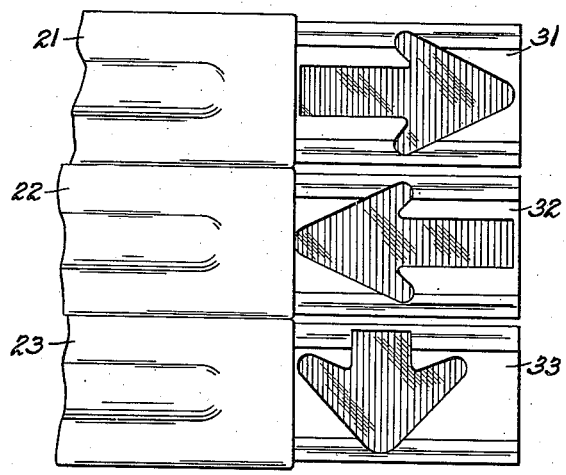
Figure 7:
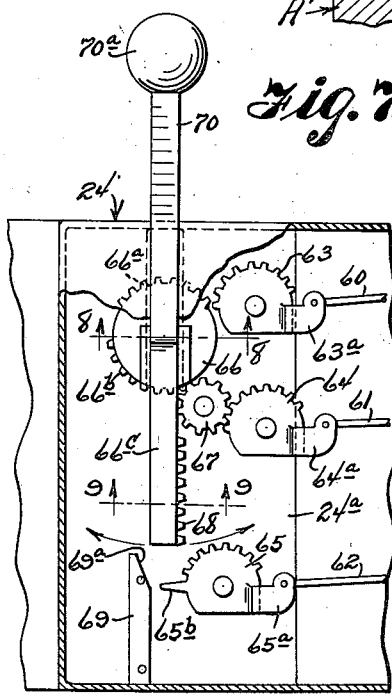

Referring then to the drawings,

Figure 1 is substantially a side elevational view of a portion of a vehicle showing the presently preferred embodiment of this invention mounted thereon, Fig. 2 is a view from the interior of the vehicle looking toward the part shown in Fig. 1, Fig. 3 is substantially a horizontal sectional view of Fig. 2 taken along the line 3—3 thereof, Fig. 4 is essentially a vertical sectional view of Fig. 3 taken along the line 4—4 thereof, Fig. 5 is a rear elevational view of the device with the three signal elements in extended exposed position, Fig. 6 is a front view of the distal end portion of the structure shown in Fig. 5, Fig. 7 is an elevational view seen from the interior of the vehicle of the signal control means, Fig. 8 is essentially a horizontal sectional view of Fig. 7 taken along the line 8—8 thereof, Fig. 9 is substantially a horizontal sectional view of Fig. 7 taken along the line 9—9 thereof, and Figs. 10 and 11 are detail views of the universal joint connecting helicoidal members forming parts of the device as hereinafter will be described.

Figure 12 is a perspective view of the helicoidal members 41 and 47 passing through the slots in the members 31c and 41a.

Referring to the drawings, especially to Figs. 1 and 2 thereof, it will be noted that the novel signalling device according to this invention generally designated by the reference character 20 is mounted in side portions of a front door A' of a vehicle A in a manner such that swinging doors 21, 22 and 23 of the signalling device are disposed substantially horizontally. The device is operated by control means 24 within the door of the vehicle and operable from the vehicle interior.

Referring now especially to Figs. 3, 4 and 5, it is to be noted that each of the swinging doors 21, 22 and 23 is pivotally mounted on hinge elements 21a, 22a and 23a respectively and that edge portions 21b, 22b and 23b respectively are bent inwardly to engage with channel members 31a, 32a and 33a respectively of the slidingly mounted signal elements 31, 32 and 33 carried on the inner sides of the doors essentially as shown. The exposed surfaces of the sliding signal elements 31, 32 and 33 are provided with appropriate direction indicating symbols and legends essentially as shown in Figs. 5 and 6 of the drawings. It will be evident that the doors 21, 22 and 23 normally are held in closed position by means of springs 25, 26 and 27 connected to parts of the doors and to interior portions of the device. In like manner the sliding signal elements 31, 32 and 33 are pulled toward the beveled mounting of the doors 21, 22 and 23 by springs 35, 36 and 37 respectively connected to the signal elements and to internal parts of the device. The inward motion of the swinging doors is restricted by abutment of the signal elements against portions of the partition 34, it being noted that openings 31b, 32b and 33b are provided through which the springs 25, 26, 27, 35, 36 and 37 pass. Small intrinsically resilient bumper elements are provided on portions of the partition 34 to minimize noise during operation of the device: one of these bumper elements is illustrated in Fig. 3 and designated by the reference character 34a.

Each of the signal elements 31, 32 and 33 is provided with a projecting lug 31c, 32c and 33c respectively having slots 31', 32' and 33', each slot being adapted to receive and embrace one of the helicoidal members 41, 42 and 43 positioned between the signal elements and the doors upon which the elements are mounted, the relationship of the parts being well shown in Figs. 3, 4 and 12. The helicoidal members 41, 42 and 43 are connected by universal joints 44, 45 and 46 to other helicoidal members, for convenience designated as second helicoidal members 47, 48 and 49. Figs. 10 and 11 illustrate details of one of the universal joints, in this instance the joint 44. It will be perceived that a spider 44a is connected by pivots 44b with bifurcated end portions of the helicoidal member 41 and with the sides of an opening formed in the end of the helicoidal member 47. It of course is clearly to be understood that the spider is freely movable with respect to both helicoidal members whereby flexibility of operation is assured. The opposite ends of the helicoidal members 47, 48 and 49 are freely rotatably mounted upon portions of carriages 53, 54 and 55 freely swingingly mounted upon brackets 50, 51 and 52 carried on side portions of the casing. Elements 47a, 48a and 49a mounted on side portions of the device housing are provided with double curved slots 47', 48' and 49' to conform with the cross section contour of the member portions of the helicoidal members 47, 48 and 49 and through which the same passes, as clearly shown in Figure 12 of the drawings.

Each of the helicoidal members is mounted in identical manner upon the corresponding carriage, the details of mounting being shown in Fig. 4 wherein it will be seen that the end portion 49b of the helicoidal member 49 is bent substantially at right angles to the axis of the member and is provided with an opening to receive the connector 49c which holds the end of the member against balls 49d rolling on a washer 49e which in turn is mounted upon portions 49f of the carriage 55. As will be apparent to those skilled in the art from the foregoing description, swinging motion of the carriages 53, 54 and 55 will cause the helicoidal members 47, 48 and 49 to rotate about their axis by reason of the fact that the helicoidal members pass through the slots in the stationary elements 47a, 48a and 49a and the rotative motion will be transferred to the helicoidal members 41, 42 and 43 through the universal joints 44, 45 and 46. As the helicoidal members 41, 42 and 43 rotate, the lugs 31c, 32c and 33c respectively are advanced axially therealong, thereby imparting sliding movement to the signal elements 31, 32 and 33. It is to be noted that the portions of the helicoidal members 47, 48 and 49 nearest the universal joints 44, 45 and 46 are substantially straight and hence initial swinging motion of the carriages 53, 54 and 55 on their pivots 53', 54' and 55', will not result in rotation of the helicoidal members, but instead will cause the doors 21, 22 and 23 respectively to move into opened position against the action of the springs 25, 26 and 27 and thereafter, as mentioned, due to rotation of the helicoidal members 41, 42 and 43, the signal elements 31, 32 and 33 will be slidingly moved into extended position essentially as is illustrated in Figs. 5 and 6 and as is shown in the phantom view designated by the reference character C in Fig. 3. An intermediate position designated by the reference character B in Fig. 3 shows the relationship of the parts during the course of outward movement of the door 21 and the signal element 31.

The novel mechanism for swinging the carriages 53, 54 and 55 will now be described, reference being made especially to Figs. 7, 8 and 9 wherein it will be noted that a connector rod 60, 61 and 62 is attached to each of the carriages 53, 54 and 55 respectively and to lever arms 63a, 64a and 65a respectively formed integral with the segmental gears 63, 64 and 65 freely rotatingly mounted upon portions of the casing 24a essentially as shown in Fig. 7. A free rotatingly mounted wheel 66 having a first toothed edge portion 66a meshing with the teeth of the segmental gear 63 and a second toothed edge portion 66b meshing with the gear 67 which in turn meshes with the gear 64 serves selectively to drive the gears 63 and 64. By this is meant that when the wheel 66 is moved in a clockwise direction, the teeth 66a meshing with the gear 63 causes the connector 60 to swing the carriage 53. In a like manner, when the wheel 66 is moved in counterclockwise direction from the rest position illustrated in Fig. 7, the connector 61 swings the carriage 54. It is especially to be noted that the gears 63 and 64 do not operate simultaneously. A bar 66c slidingly received in a channel 66d formed on the top of the wheel 66 and provided with a rack end portion 68 engages with the gear 65 to cause the connector 62 to swing the carriage 55. Engagement of the rack and gear is facilitated by the extended tooth 65b provided on the gear 65 and by the guide 69 having an inclined rod end 69a for holding the rack against the gear. The sliding bar 66c normally is held in raised position as shown in Fig. 7 by a spring 68a whereby the teeth of the rack are out of engagement with the gear 65 and, during swinging of the wheel 66 to cause operation of the gear 63 and 64 as aforesaid, the end of the rack clears the gear 65. An operating handle 70 connected to the bar 66c and terminating in a head 70a is provided to facilitate operation of the signalling device. The wheel 66 is provided with a stub shaft 66' mounted in the bracket 66b carried by the casing.

Having thus described the structural features of the novel signalling device according to this invention, its preferred mode of operation now will be described, reference being made to the illustrated embodiment of the invention. If for instance it is desired to signal an intended turn to the left, the handle 70 is moved in a clockwise direction in conformance with the directions indicated in the escutcheon plate 70b whereby the gear 63 is rotated and the carriage 53 is swung from normal position causing the door 21 to be opened and the signal element 31 to be moved into extended position. In like manner, counterclockwise movement of the handle 70 will cause rotation of the gear 64 and swinging motion of the carriage 54, thereby opening the door 22 and moving the signal element 32 into extended position. As will be evident, this signal is intended to indicate an intended turn to the right. When it is desired to indicate an intention to slow down the speed of the car, the handle 70 is moved downwardly from its normal raised position shown in Fig. 7 whereby the gear 65 is rotated causing the carriage 55 to be swung upon its axis and opening the door 23 whereby the signal element 33 is moved outwardly into extended position. Release of the handle in each instance permits the parts to be returned to their normal positions by spring action.

It is to be understood of course that this invention is capable of extended application and is not confined to the precise illustrated forms nor described construction and, therefore, such changes and modifications may be made therein as do not affect the spirit of the invention nor exceed the scope of the appended claims.

Having thus described the present invention, what it is desired to secure by Letters Patent is:

1. In a signalling device of the type comprising a casing within which a pivotally mounted horizontally outwardly swinging signal arm normally is concealed, the arm forming a cover for the casing and being spring-urged into closed position; the improvements which comprise a first helicoidal member rotatably mounted within the arm; a sliding signal element mounted on said arm connected to and movable by rotation of said member; a swinging carriage mounted within said casing; a second helicoidal member freely rotatably mounted on said carriage connected to and rotatable with the first helicoidal member; a stationary element mounted within the casing embracing the second helicoidal member whereby swinging motion of the carriage causes the signal element to be slidingly moved outwardly into fully extended position; and an operating lever connected to said carriage for imparting swinging motion thereto.

2. A signalling device comprising a series of horizontally swinging signal arms; means for selectively swinging one of said signal arms comprising a series of segmental gears, one connected to and operating each of said signal arms; a discontinuously toothed gear wheel operating depending upon its direction of rotation, one of a plurality of said segmental gears; and a sliding rack carried on said wheel engaging with and operating another segmental gear.

3. In a vehicle signalling device of the type comprising a casing having superposed horizontally extending compartments within each of which a pivotally mounted horizontally outwardly swinging signal arm normally is concealed, each arm forming a cover for the corresponding compartment and being spring urged into closed position; the improvements which comprise first helicoidal members, one rotatably within each of the arms; sliding signal elements, one mounted on each of said arms connected to and movable by rotation of the corresponding helicoidal member; swinging carriages, one mounted within each of said compartments; second helicoidal members, one freely rotatably mounted on each of said carriages connected to and rotatable with the corresponding first helicoidal members; stationary elements mounted within the compartments embracing the second helicoidal members whereby swinging motion of the carriages causes the signal elements to be slidingly moved outwardly into fully extended position; and means for selectively swinging one of said carriages comprising a series of segmental gears, one connected to and operating each of said signal arms; a discontinuously toothed gear wheel operating depending upon its direction of rotation, one of a plurality of said segmental gears; and a sliding rack carried on said wheel engaging with and operating another segmental gear.

WILLIAM P. HERZER.